United States Patent
Solotke et al.

(10) Patent No.: US 10,841,880 B2
(45) Date of Patent: Nov. 17, 2020

(54) APPARATUS AND METHODS FOR WAKE-LIMITING WITH AN INTER-DEVICE COMMUNICATION LINK

(71) Applicant: APPLE INC., Cupertino, CA (US)

(72) Inventors: Richard M. Solotke, Cupertino, CA (US); Saurabh Garg, Cupertino, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 16/140,317

(22) Filed: Sep. 24, 2018

(65) Prior Publication Data

US 2019/0132797 A1 May 2, 2019

Related U.S. Application Data

(63) Continuation of application No. 15/008,229, filed on Jan. 27, 2016, now Pat. No. 10,085,214.

(51) Int. Cl.
*H04W 52/02* (2009.01)

(52) U.S. Cl.
CPC ......... *H04W 52/0235* (2013.01); *Y02D 30/70* (2020.08)

(58) Field of Classification Search
CPC ...... G06F 1/3203; G06F 1/3228; G06F 1/329; G06F 1/3287; G06F 1/3293; G06F 9/5005; G06F 9/4418; G06F 9/542; H04W 52/0235; H04W 52/0209; H04W 52/0225; H04W 52/0229; H04W 52/0251; H04W 88/02

See application file for complete search history.

(56) References Cited

U.S. PATENT DOCUMENTS

| | | | |
|---|---|---|---|
| 4,805,137 A | 2/1989 | Grant et al. |
| 4,949,299 A | 8/1990 | Pickett et al. |
| 4,987,529 A | 1/1991 | Craft et al. |
| 5,339,427 A | 8/1994 | Elko et al. |
| 5,367,688 A | 11/1994 | Croll |

(Continued)

FOREIGN PATENT DOCUMENTS

| | | |
|---|---|---|
| EP | 3013008 A1 | 4/2016 |
| JP | H02306082 A | 12/1990 |

(Continued)

OTHER PUBLICATIONS

ECN L1 PM Substates with CLKREQ approved Aug. 23, 2012.

(Continued)

*Primary Examiner* — Hoang-Chuong Q Vu

(74) *Attorney, Agent, or Firm* — Gazdzinski & Associates, PC

(57) ABSTRACT

Methods and apparatus for limiting wake requests from one device to one or more other devices. In one embodiment, the requests are from a peripheral processor to a host processor within an electronic device such as a mobile smartphone or tablet which has power consumption requirements or considerations associated therewith. In one implementation, the peripheral processor includes a wake-limiting procedure encoded in e.g., its software or firmware, the procedure mitigating or preventing continuous and/or overly repetitive "wake" requests from the peripheral processor.

20 Claims, 8 Drawing Sheets

(56) References Cited

U.S. PATENT DOCUMENTS

| | | | |
|---|---|---|---|
| 5,467,459 A | 11/1995 | Alexander et al. | |
| 5,485,578 A | 1/1996 | Sweazey | |
| 5,613,086 A | 3/1997 | Frey et al. | |
| 5,659,542 A | 8/1997 | Bell et al. | |
| 5,692,182 A | 11/1997 | Desai et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,008,992 A | 12/1999 | Kawakami | |
| 6,212,566 B1 | 4/2001 | Vanhoof et al. | |
| 6,216,178 B1 | 4/2001 | Stracovsky et al. | |
| 6,233,702 B1 | 5/2001 | Horst et al. | |
| 6,260,152 B1 | 7/2001 | Cole et al. | |
| 6,359,863 B1 | 3/2002 | Varma et al. | |
| 6,411,997 B1 | 6/2002 | Dawes et al. | |
| 6,434,633 B1 | 8/2002 | Braun et al. | |
| 6,466,898 B1 * | 10/2002 | Chan | G06F 30/33 |
| | | | 703/17 |
| 6,485,081 B1 | 11/2002 | Bingle et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,735,642 B2 | 5/2004 | Kagan et al. | |
| 6,815,873 B2 | 11/2004 | Johnson et al. | |
| 6,840,257 B2 | 1/2005 | Dario et al. | |
| 6,843,465 B1 | 1/2005 | Scott | |
| 6,947,442 B1 | 9/2005 | Sato et al. | |
| 6,948,094 B2 | 9/2005 | Schultz et al. | |
| 6,973,701 B2 | 12/2005 | Momoda et al. | |
| 7,013,536 B2 | 3/2006 | Golden et al. | |
| 7,032,282 B2 | 4/2006 | Powell et al. | |
| 7,055,793 B2 | 6/2006 | Biehl et al. | |
| 7,099,949 B1 | 8/2006 | Vanhoof et al. | |
| 7,100,020 B1 | 8/2006 | Brightman et al. | |
| 7,127,600 B2 | 10/2006 | Zimmer et al. | |
| 7,159,221 B1 * | 1/2007 | Willen | G06F 9/5044 |
| | | | 711/117 |
| 7,191,240 B1 | 3/2007 | Johnson | |
| 7,281,172 B2 | 10/2007 | Chujo | |
| 7,347,221 B2 | 3/2008 | Berger et al. | |
| 7,397,774 B1 | 7/2008 | Holland et al. | |
| 7,398,382 B2 | 7/2008 | Rothman et al. | |
| 7,506,084 B2 | 3/2009 | Moerti et al. | |
| 7,509,391 B1 | 3/2009 | Chauvel et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,650,914 B2 | 1/2010 | Bogursky et al. | |
| 7,681,012 B2 | 3/2010 | Verm et al. | |
| 7,685,476 B2 | 3/2010 | Andre et al. | |
| 7,813,366 B2 | 10/2010 | Freimuth et al. | |
| 7,853,731 B1 | 12/2010 | Zeng | |
| 7,864,720 B2 | 1/2011 | Jeyaseelan | |
| 7,899,941 B2 | 3/2011 | Hendry et al. | |
| 7,908,335 B1 | 3/2011 | Citterelle et al. | |
| 7,926,520 B2 | 4/2011 | Bogursky et al. | |
| 7,941,682 B2 | 5/2011 | Adams | |
| 7,957,777 B1 | 6/2011 | Vu et al. | |
| 8,113,243 B2 | 2/2012 | Bogursky et al. | |
| 8,230,248 B2 | 7/2012 | Dance et al. | |
| 8,255,725 B2 | 8/2012 | Shimazaki et al. | |
| 8,310,965 B1 | 11/2012 | Zhang et al. | |
| 8,352,624 B2 | 1/2013 | Zimmerman et al. | |
| 8,359,449 B2 | 1/2013 | Accapadi | |
| 8,422,404 B2 | 4/2013 | Taki | |
| 8,468,285 B2 | 6/2013 | Kobayashi | |
| 8,540,206 B2 | 9/2013 | Foshansky et al. | |
| 8,555,099 B2 | 10/2013 | Marinkovic et al. | |
| 8,600,820 B2 | 12/2013 | Hoffman | |
| 8,635,412 B1 | 1/2014 | Wilshire | |
| 8,656,228 B2 | 2/2014 | Check et al. | |
| 8,756,601 B2 | 6/2014 | Plondke et al. | |
| 8,769,168 B2 | 7/2014 | Moertl et al. | |
| 8,788,822 B1 | 7/2014 | Riddle | |
| 8,799,537 B1 | 8/2014 | Zhu et al. | |
| 8,808,091 B2 | 8/2014 | Shaw et al. | |
| 8,819,386 B1 | 8/2014 | Mather | |
| 8,832,331 B2 | 9/2014 | Co | |
| 8,848,809 B2 | 9/2014 | Whitby-Strevens | |
| 8,851,443 B2 | 10/2014 | Foshansky | |
| 8,862,923 B1 * | 10/2014 | Leung | G06F 1/32 |
| | | | 713/324 |
| 8,876,062 B1 | 11/2014 | Baghdasarian | |
| 8,914,649 B2 | 12/2014 | So et al. | |
| 8,939,180 B2 | 1/2015 | Bogursky et al. | |
| 8,946,934 B2 | 2/2015 | Butts et al. | |
| 9,021,275 B1 * | 4/2015 | Greenan | G06F 3/0635 |
| | | | 713/300 |
| 9,027,903 B2 | 5/2015 | Arekar et al. | |
| 9,152,580 B1 | 10/2015 | Chau et al. | |
| 9,170,957 B2 | 10/2015 | Touzni et al. | |
| 9,280,360 B2 | 3/2016 | Xu et al. | |
| 9,319,090 B2 | 4/2016 | Whitby-Strevens | |
| 9,356,844 B2 | 5/2016 | Kim et al. | |
| 9,439,142 B2 * | 9/2016 | Zhu | H04W 52/0216 |
| 9,544,069 B2 | 1/2017 | Whitby-Strevens et al. | |
| 9,547,535 B1 | 1/2017 | Wilt | |
| 9,568,970 B1 | 2/2017 | Kaushal et al. | |
| 9,582,448 B2 | 2/2017 | Saitou | |
| 9,594,718 B2 | 3/2017 | Kaushik et al. | |
| 9,628,211 B1 | 4/2017 | Stoler et al. | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,932,757 B2 | 4/2018 | Hager et al. | |
| 9,946,325 B2 | 4/2018 | Leucht-Roth et al. | |
| 9,959,124 B1 | 5/2018 | Herbeck et al. | |
| 1,014,669 A1 | 12/2018 | Krigovski et al. | |
| 2002/0013868 A1 | 1/2002 | West | |
| 2002/0044553 A1 | 4/2002 | Chakravorty | |
| 2002/0065867 A1 | 5/2002 | Chauvel | |
| 2002/0169938 A1 | 11/2002 | Scott et al. | |
| 2002/0195177 A1 | 12/2002 | Hinkley et al. | |
| 2003/0014607 A1 | 1/2003 | Slavin et al. | |
| 2003/0086122 A1 | 5/2003 | Parry | |
| 2003/0099221 A1 | 5/2003 | Rhee | |
| 2003/0112758 A1 | 6/2003 | Pang et al. | |
| 2003/0200413 A1 | 10/2003 | Gurumoorthy et al. | |
| 2004/0044929 A1 | 3/2004 | Chujo | |
| 2004/0064589 A1 | 4/2004 | Boucher et al. | |
| 2004/0128568 A1 | 7/2004 | O'Shea | |
| 2004/0179546 A1 | 9/2004 | McDaniel et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2004/0268172 A1 | 12/2004 | Kates et al. | |
| 2005/0005980 A1 | 1/2005 | Eberhardt et al. | |
| 2005/0033947 A1 | 2/2005 | Morris et al. | |
| 2005/0047356 A1 | 3/2005 | Fujii et al. | |
| 2005/0076122 A1 * | 4/2005 | Khawand | H04L 67/14 |
| | | | 709/226 |
| 2005/0076196 A1 | 4/2005 | Zimmer et al. | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0149711 A1 | 7/2005 | Zimmer et al. | |
| 2005/0157781 A1 | 7/2005 | Ho et al. | |
| 2005/0198777 A1 | 9/2005 | Mabe | |
| 2005/0285862 A1 | 12/2005 | Noda et al. | |
| 2006/0039285 A1 | 2/2006 | Chapman et al. | |
| 2006/0075269 A1 | 4/2006 | Liong et al. | |
| 2006/0107071 A1 | 5/2006 | Girish et al. | |
| 2006/0186700 A1 | 8/2006 | Browne et al. | |
| 2006/0186706 A1 | 8/2006 | Browne et al. | |
| 2006/0218301 A1 | 9/2006 | O'Toole et al. | |
| 2006/0232051 A1 | 10/2006 | Morris et al. | |
| 2006/0259799 A1 * | 11/2006 | Melpignano | G06F 9/5088 |
| | | | 713/300 |
| 2007/0005869 A1 | 1/2007 | Balraj et al. | |
| 2007/0043901 A1 | 2/2007 | Wu et al. | |
| 2007/0063540 A1 | 3/2007 | Browne et al. | |

(56) References Cited

U.S. PATENT DOCUMENTS

| | | |
|---|---|---|
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0083687 A1 | 4/2007 | Rinaldi et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0218225 A1 | 9/2008 | Shibayama |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0083560 A1 | 3/2009 | O'Connell et al. |
| 2009/0109230 A1* | 4/2009 | Miller .................. G06F 15/16 345/506 |
| 2009/0113141 A1 | 4/2009 | Bullman et al. |
| 2009/0133016 A1 | 5/2009 | Brown et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0282050 A1 | 11/2009 | Thomas et al. |
| 2009/0282088 A1 | 11/2009 | Thomas et al. |
| 2009/0310618 A1 | 12/2009 | Carter |
| 2009/0322531 A1 | 12/2009 | Estevez et al. |
| 2009/0327074 A1* | 12/2009 | Callaway, Jr. .......... G06Q 30/02 705/14.49 |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0082859 A1 | 4/2010 | Hendry et al. |
| 2010/0097931 A1 | 4/2010 | Mustafa |
| 2010/0098419 A1 | 4/2010 | Levy et al. |
| 2010/0161959 A1 | 6/2010 | Sood |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276695 A1* | 11/2011 | Maldaner .............. G06F 9/5083 709/226 |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0066523 A1 | 3/2012 | Kobayashi |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0120959 A1 | 5/2012 | Krause |
| 2012/0124252 A1 | 5/2012 | Kayama et al. |
| 2012/0151913 A1 | 6/2012 | Foshansky |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0111896 A1 | 5/2013 | Foshansky et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0166943 A1* | 6/2013 | Song .................. G06F 9/505 714/4.11 |
| 2013/0173950 A1 | 7/2013 | Banerjea |
| 2013/0188544 A1 | 7/2013 | Tiwari et al. |
| 2013/0290947 A1 | 10/2013 | Li |
| 2014/0033220 A1 | 1/2014 | Campbell et al. |
| 2014/0082242 A1 | 3/2014 | Murphy et al. |
| 2014/0122828 A1 | 5/2014 | Kagan et al. |
| 2014/0129784 A1* | 5/2014 | Chapman .............. G06F 1/329 711/154 |
| 2014/0173236 A1 | 6/2014 | Kegel |
| 2014/0189057 A1 | 7/2014 | Sankoda et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2014/0372656 A1 | 12/2014 | Sakurai et al. |
| 2015/0036051 A1 | 2/2015 | Broberg et al. |
| 2015/0149797 A1* | 5/2015 | Kanigicherla .......... G06F 1/324 713/320 |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0267690 A1 | 9/2015 | Foshansky et al. |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0070323 A1* | 3/2016 | Patil .................. G06F 1/3253 713/310 |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0179157 A1 | 6/2016 | Ardanaz et al. |
| 2016/0191400 A1 | 6/2016 | Sreeramoju |
| 2016/0208539 A1 | 7/2016 | Hofmann et al. |
| 2016/0224097 A1 | 8/2016 | Hirouchi |
| 2016/0224442 A1 | 8/2016 | Sanghi et al. |
| 2016/0266633 A1 | 9/2016 | Rabii |
| 2016/0269991 A1 | 9/2016 | Van et al. |
| 2016/0299860 A1 | 10/2016 | Harriman |
| 2016/0364350 A1 | 12/2016 | Sanghi et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0222943 A1 | 8/2017 | Yao et al. |
| 2017/0228481 A1 | 8/2017 | Pusuluri et al. |
| 2017/0249098 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0325124 A1 | 11/2017 | Mitra et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |

(56) References Cited

FOREIGN PATENT DOCUMENTS

| | | |
|---|---|---|
| JP | 2013246642 A | 12/2013 |
| JP | 2015001867 A | 1/2015 |
| KR | 20150041072 A | 4/2015 |
| KR | 20150079788 A | 7/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.
PCI Express base Specification Revision 3.0, published Nov. 10, 2010.
PCI Express Base Specification Revision 3.1, published Oct. 8, 2014.
Universal Serial Bus, Communication Class, Subclass Specifications for Network Control Model (NCM) Devices; Revision 1.0 (Errata 1), Nov. 24, 2010, published by USB Implementers Forum, Inc.
Example of System Topology, Principle and System Structure of PCI, PCI-X and PCI Express, Mingjin Ma, Apr. 30, 2007.

\* cited by examiner

_US 10,841,880 B2_

APPARATUS AND METHODS FOR WAKE-LIMITING WITH AN INTER-DEVICE COMMUNICATION LINK

PRIORITY

This application is a continuation of, and claims the benefit of priority to, co-owned and co-pending U.S. patent application Ser. No. 15/008,229 filed Jan. 27, 2016 of the same title, issuing as U.S. Pat. No. 10,085,214 on Sep. 25, 2018, the contents of which being incorporated herein by reference in its entirety.

RELATED APPLICATIONS

This application is related to commonly owned and co-pending U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015, Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, Ser. No. 14/856,283 entitled "METHODS AND APPARATUS FOR AGGREGATING PACKET TRANSFER OVER A VIRTUAL BUS INTERFACE", filed Sep. 16, 2015, and Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015, and commonly owned and co-pending U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of electronics devices, as well as networks thereof. More particularly, in one exemplary aspect, the disclosure is directed to methods and apparatus for implementing an inter-device (e.g., processor communication or IPC link between two (or more) independently operable devices. Various aspects of the present disclosure are directed to, inter alia, power management.

2. Description of Related Technology

Many electronic devices, such as e.g., mobile devices and portable computing devices, include integrated circuits such as e.g., an Application Processor (AP) system on a chip (SoC), which is a main processor chip designed to support one or more applications running in the operating environment of the electronic device (e.g., host processor). The AP is in data communication with other peripheral chipsets (e.g., processors) of the device, such as e.g., cellular and/or Wi-Fi chipsets via a memory-mapped interconnect and/or bus.

Various bus architectures and techniques have evolved over time which enable handling of increasingly faster data rates and provide higher levels of data throughput for the AP and/or peripheral processors. One such example is Peripheral Component Interconnect Express (PCIe); see e.g., PCI Express Base Specification Revision 3.1 dated Oct. 8, 2014. PCIe is a high-speed serial computer expansion bus standard designed to replace older PCI and similar bus standards. In terms of architecture, PCIe is based on point-to-point connectivity with separate serial links connecting each endpoint peripheral component (e.g., graphics card, memory, Wi-Fi, cellular, etc.) to the root complex or host processor (including the AP).

Communication between the AP and the peripheral chipsets via PCIe has many desirable attributes in terms of, inter alia, performance and flexibility. However, PCIe (as well as some other existing "computer-centric" bus technologies) suffer certain disabilities, especially from the standpoint of portable consumer electronic device implementations. Specifically, as noted above, extant PCIe technologies were developed for use within desktop, server, and laptop computers, which are to varying degrees agnostic to many electrical power considerations affecting smaller portable devices. Desktops and servers (and to a lesser degree laptops) are less concerned with electrical power consumption/conservation, and more concerned with bus performance, ability to "hot plug", and the like. Accordingly, implementing a technology such as PCIe which, in its current incarnation, both (i) consumes significant electrical power during operation, and (ii) has limited power management infrastructure (e.g., application or host processor and chipset "sleep" states, and management of data and transactions during such sleep states), is generally unsuitable for portable consumer electronics applications where power consumption and battery conservation are critical (such as e.g., cellular- and Wi-Fi-enabled smartphones, tablets, "phablets", portable media players, etc.). Further, other device components, such as the AP and the peripheral chipsets each consume additional electrical power during operation.

In order to limit power consumption within the electronic device, both of the AP and the peripheral chipsets may be automatically and independently switched between one or more lower power states (e.g., an awake-low power state, a sleep-low power state, etc.) during periods of non-use and a higher power state (e.g., an awake-high power state) during periods of use. There is generally a power consumption versus latency trade-off, where the lowest power state (e.g., sleep-low power) consumes the least amount of power but requires a longer duration of time to return to the fully awake state. Further, the energy cost associated with switching from the sleep-low power state to the fully awake state is potentially greater than that associated with switching from the awake-low power state to the fully awake state. Therefore it is typically desirable that the AP and/or the peripheral chipsets enter their lowest power states only during longer periods of non-use.

In some instances, user inactivity can initiate switching from a fully awake state to a lower power state. For example, after a shorter period of user inactivity, the AP may be switched to the awake-low power state, while after a longer period of user inactivity, the AP may be switched to the sleep-low power state. In other instances, activity or communication from the AP and the peripheral chipsets can initiate switching from a lower power state to a fully awake state (e.g., an awake-high power state) if the other chip is in a lower power state. For example, activity or communication from the AP, such as e.g., an uplink request, can initiate switching of the peripheral chipset in a lower power state to a fully awake state and/or activity or communication from the peripheral chipset, such as e.g., a downlink request, can initiate switching of the AP in a lower power state to a fully awake state. In the foregoing examples, mechanisms for causing switching and transition to a fully awake state may include built-in mechanisms from the interconnect (e.g., PCIe), such as e.g., PCIe WAKE# general purpose input/output (GPIO), or out-of-band mechanisms independent of the interconnect, such as e.g., a proprietary GPIO.

The interconnect (e.g., PCIe) between the AP and the peripheral chip sets may be controlled by a software layer, referred to as an inter-processor communication (IPC) layer. The IPC layer may define various power states to achieve different power versus latency tradeoffs. In some examples, the IPC layer may allow the AP to enter the lowest power state (e.g., sleep-low power), while in other examples the IPC layer may prevent the AP from entering the lowest power state. The peripheral chipset may signal the IPC layer to switch from a lower power state to a higher power state. Thus, signaling from the peripheral to the IPC layer may subsequently signal the AP to switch from a lower power state to a higher power state.

The AP may be responsible for initiating all uplink and downlink transactions. Thus, peripheral chipsets are only able to send a downlink data packet when the AP is in the awake-high power state and enables or opens the corresponding interconnect pathway (e.g., a "unidirectional pipe"). In a related aspect, the peripheral chipsets may signal to the AP to open an interconnect pathway, thereby requesting "wake up" (i.e., switching from a lower power state to a higher power state) of the AP if the AP is in a lower power state. In some cases, the peripheral chipset may continuously or repeatedly request "wake up" of the AP if there is no response from the AP and/or if there is an error in transfer of the data packet, thereby causing unnecessary power consumption by the peripheral chipset, the interconnect, and/or the AP. Such operational scenarios and requirements are quite common with the aforementioned cellular devices, media players, and similar devices.

Hence, there is a need for improved apparatus and associated methods which can leverage the high data throughput and other desirable attributes of bus technologies such as PCIe (and other "memory mapped" technologies), yet support the requirements of rigorous power management and conservation, as well as the ability to support various combinations of operational sleep states or other reduced-power modes by various chips or chipsets within the device.

SUMMARY

The present disclosure satisfies the foregoing needs by providing, inter alia, methods and apparatus for implementing an inter-device (e.g., inter-processor communication (IPC)) link between two (or more) devices, such as two or more independently operable processors. (e.g., a host processor and a peripheral processor), and limiting "wake" of a first device by a second device when the first device is in a lower power state than the second device.

In one aspect, a method performed by a first device to limit wake requests to a second device is disclosed. In one embodiment, the method includes: detecting a condition for determining whether to send a wake request to the second device; determining that one or more data units are to be transferred from the first device to the second device over one or more data lines; for each data line of the one or more data lines, determining whether a number of previous wake requests associated with the data line is less than a wake limit threshold; and in response to determining that at least one of the data lines is associated with a number of previous wake requests that is less than the wake limit threshold, sending a wake request to the second device.

In one variant, the first and second devices include digital processors, and the detecting the condition for determining whether to send the wake request to the second device comprises detecting that the second device has switched from a first power state to a second, lower power state.

In another variant, detecting the condition for determining whether to send the wake request to the second device comprises determining that a new data unit is to be transferred from the first device to the second device over a first data line of the one or more data lines. In one implementation of this variant, the method further includes, in response to determining that the new data unit is to be transferred from the first device to the second device over the first data line, setting a number of previous wake requests associated with the first data line to zero.

In yet a further variant, the method includes, for each data line of the one or more data lines, detecting that the data line is enabled, and setting a number of previous wake requests associated with the data line to zero.

In another variant, the method further includes setting a number of previous wake requests associated with the first data line to zero in response to determining that a first data unit of the one or more data units is transferred from the first device to the second device over a first data line of the one or more data lines.

In another aspect of the disclosure, processor apparatus adapted for use in a portable device is disclosed. In one embodiment, the processor apparatus includes: a first digital processor; and storage apparatus in data communication with the first digital processor. In one variant, the storage apparatus includes a plurality of computer readable instructions configured to, when executed by the first digital processor, cause the first digital processor to: determine that one or more data units are to be transferred from the first processor to the second processor over one or more data lines; for each data line of the one or more data lines, determine whether one or more previous wake requests associated with the data line meets a prescribed criterion (e.g., is less than a wake limit threshold); and in response to determining that at least one of the data lines is associated with a number of previous wake requests that meets the criterion (e.g., is less than the wake limit threshold), send a wake request to the second processor.

In one variant, the plurality of computer readable instructions are further configured to, when executed by the first digital processor, cause the first digital processor to detect a condition for determination whether to send the wake request to the second processor, the detection comprising detection that the second processor has switched from a first power state to a second, lower power state.

In another variant, the plurality of computer readable instructions are further configured to, when executed by the first digital processor, cause the first digital processor to, in response to a determination that one or more new data units is to be transferred from the first processor to the second processor over the first data line, set a number of previous wake requests associated with the first data line to zero.

In yet another variant, the plurality of computer readable instructions are further configured to, when executed by the first digital processor, cause the first digital processor to, for each data line of the one or more data lines, detect that the data line is enabled, and set a number of previous wake requests associated with the data line to zero.

In another aspect of the disclosure, a portable electronic device configured for power management is disclosed. In one embodiment, the portable electronic device is a wireless-enabled mobile smartphone, and includes: a first processor; a second processor in data communication with the first processor via one or more data lines; and storage apparatus in data communication with at least the first digital processor, the storage apparatus comprising a plurality of computer readable instructions. In configured to, when executed by the first digital processor, cause the first digital processor to: upon receipt of data indicating a state change, determine that one or more data units are to be transferred from the first processor to the second processor over the one or more data lines; for each data line of the one or more data lines, determine that a number of previous wake requests associated with the data line is less than a wake limit threshold; and based at least on the determination that at least one of the data lines is associated with a number of previous wake requests less than the wake limit threshold, send a wake request to the second processor.

In a further aspect of the disclosure, a method of operating a wireless-enabled portable device is disclosed. In one embodiment, the method includes avoiding unnecessary "wake ups" of one or more integrated circuit devices of the portable device (e.g., an application processor) by other peripheral integrated circuits, such as the baseband (wireless) chip set.

In another aspect, processing logic which can leverage the high data throughput and other desirable attributes of bus technologies such as PCIe (and other "memory mapped" technologies) is disclosed. In one embodiment, the logic comprises software and/or firmware operative to be executed by integrated circuit digital processors of a portable device. Such logic also in one implementation supports the requirements of rigorous power management and conservation, as well as the ability to support various combinations of operational sleep states or other reduced-power modes by various chips or chipsets within the portable device.

In a further aspect of the disclosure, integrated circuity configured to implement "intelligent" power and state management is disclosed. In one embodiment, the integrated circuitry includes one or more semiconductive die with digital processor apparatus disposed thereon and configured to communicate with one or more other integrated circuit devices within a common platform (e.g., mobile wireless device).

In yet another aspect, a computer-readable apparatus is disclosed. In one embodiment, the apparatus includes a storage medium configured to retain one or more computer programs in a non-transitory fashion, and which is accessible by a digital processing apparatus.

Other features and advantages of the present disclosure will immediately be recognized by persons of ordinary skill in the art with reference to the attached drawings and detailed description of exemplary embodiments as given below.

Figure 1:
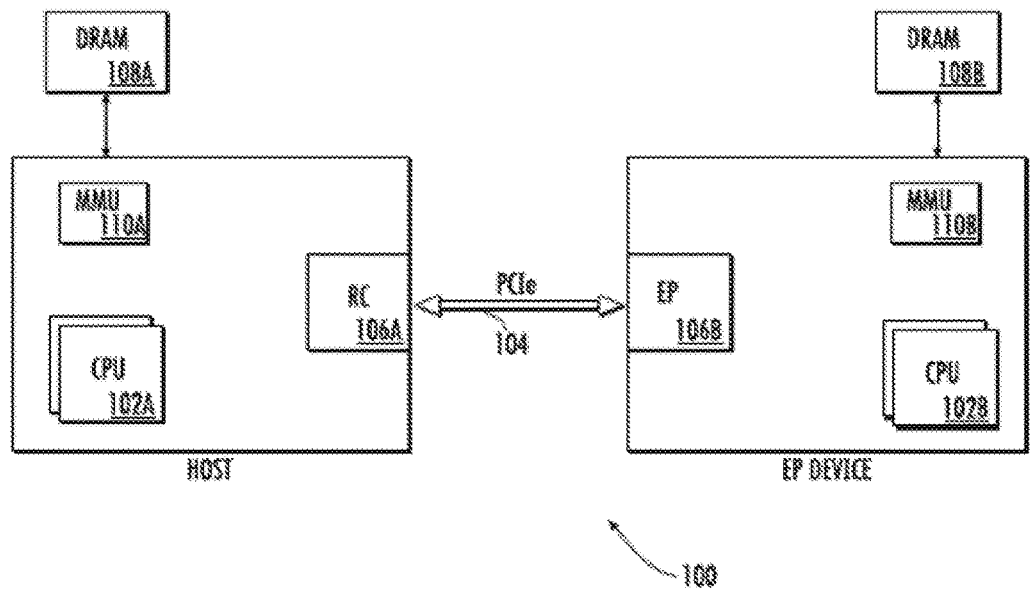
FIG. 1 is a logical block diagram of one exemplary apparatus useful for illustrating various principles described herein.

All Figures © Copyright 2014-2016 Apple, Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE", filed Sep. 16, 2015, previously incorporated by reference in its entirety), it will be recognized by those of ordinary skill that the present disclosure is not so limited. In fact, the various aspects of the disclosure are useful in any device or network of devices that is configured to incorporate and coordinate multiple independent devices (e.g. processing elements), including e.g., in an inter-platform fashion (e.g., across two or more discrete host devices) as is disclosed herein.

Various embodiments described herein may be used in conjunction with power management schemes such as those described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, previously incorporated by reference in its entirety.

Additionally, various embodiments described herein may also be used in conjunction with error recovery schemes, such as those described within commonly owned and co-pending U.S. patent application Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, previously incorporated by reference in its entirety.

Further, while the following embodiments describe specific implementations of e.g., dedicated address spaces, legacy support capabilities, and specific protocols, those of ordinary skill in the related arts will readily appreciate that such descriptions are purely illustrative.

Moreover, while exemplary implementations are described in the context of the PCIe protocol, it will be appreciated that the various features and techniques described herein can be applied to and implemented using other bus protocols, including especially those based on memory-mapped schemes.

Exemplary Inter-Processor Communications Link

As previously noted, bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting each peripheral endpoint component (e.g., graphics card, memory, Wi-Fi, cellular, etc.) to the root complex or host processor (including and/or coupled to the application processor (AP)). However, existing PCIe technologies, as well as the various chipsets within the device, consume significant power and therefore may be unsuitable for many portable consumer electronics applications.

Within this context, exemplary methods and apparatus are now described which support an inter-processor communication (IPC) link between two (or more) independently operable processors (e.g., the AP and peripheral chipsets). The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

In one aspect, the IPC protocol is based on a "shared" memory interface for run-time processing (i.e., the independently operable processors each share, either virtually or physically, a common memory interface). In one such embodiment, the shared memory interface provides a multi-channel IPC path for high throughput transfers. In one exemplary implementation, the shared memory interface remains functional when any one of the independently operable processors is active, even when one or more of the remaining independently operable processors are asleep (i.e., in a low power state), powered down, powered off, etc.

In another aspect, the IPC link is configured to control, inter alia, sleep procedures or switching between lower power states to higher power states (as defined separately for the host and peripheral processors), and error handling.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

FIG. 1 illustrates exemplary apparatus 100 (e.g., an electronic device) useful for illustrating various principles described herein. As shown, the apparatus 100 includes a first processor 102A and a second processor 102B, and a physical bus interface 104 that is configured to implement an inter-processor communication (IPC) link between two (or more) independently operable processors.

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem (e.g., Wi-Fi or cellular peripheral processor). As used herein, the term "wireless" includes, without limitation, Long Term Evolution/Advanced (LTE and LTE-A) technology, devices implementing IEEE-Std. 802.11 (any variants thereof), PAN technology such as e.g., Bluetooth or IEEE Std. 802.15.4, "ZigBee" or other simplified or "IoT (Internet of Things)" interfaces, near field communication/RFID, WiMAX (IEEE 802.16), WMANs, 3G cellular (e.g., WCDMA, 3GPP, 3GPP2, and GSM and improvements thereon, and ISM band devices, as well as combinations of the foregoing (e.g., where NFC is used to enable rapid negotiation between devices to enable subsequent communications over a Bluetooth or Wi-Fi Direct link).

In other embodiments, the second processor 102B may be e.g., a media processor, or other network processing element. As shown in FIG. 1, the second processor 102B is coupled to an endpoint (EP) 106B which functions as the peripheral of the IPC bus.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions (e.g., in the form of one or more computer programs) for execution by their respective processors.

Figure 2:
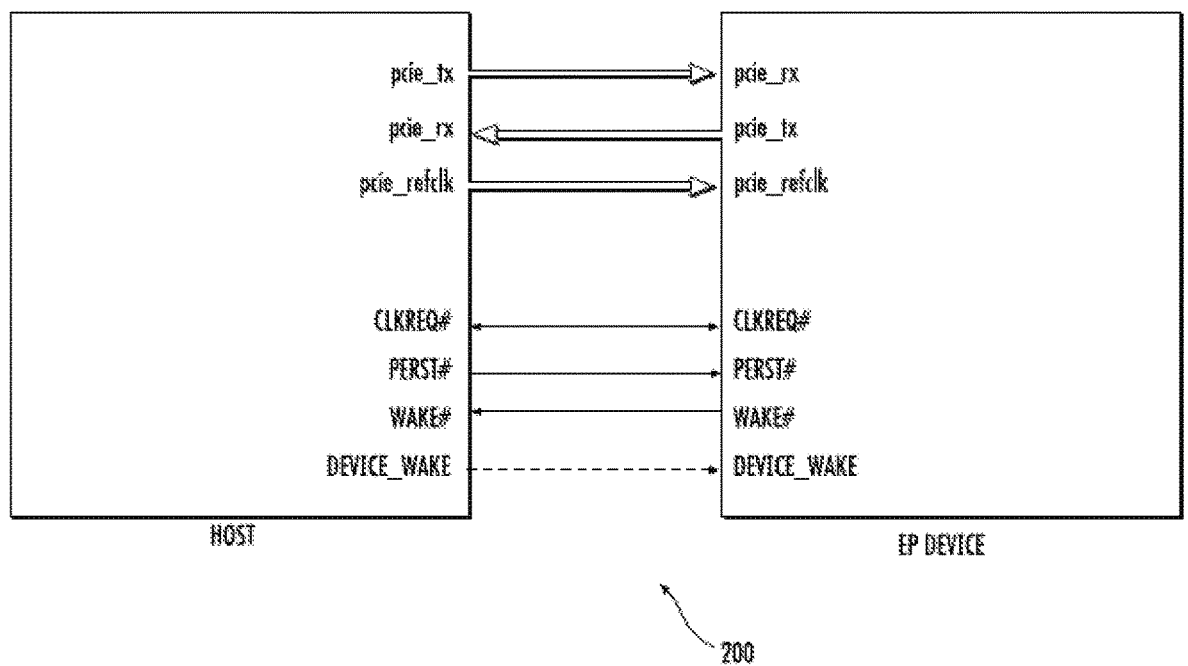
FIG. 2 is a logical block diagram of one exemplary physical bus interface useful in conjunction with the various principles described herein.

As shown in FIG. 2, the physical bus interface 104 is loosely based on the Peripheral Component Interconnect Express (PCIe) standard (e.g., as is described in "PCI Express Base Specification Revision 3.0" published Nov. 10, 2010, and "ECN L1 PM Substates with CLKREQ" approved Aug. 23, 2012). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality is described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one lane 200 is shown in FIG. 2), each lane having receive and transmit component (pcie rx, pci tx). Each lane is a full-duplex byte stream, transporting data packets in eight-bit 'byte' formats, between the RC and EP of a link, in both directions simultaneously. The physical IPC link 104 can support multiple logical links (or virtual bus interfaces) representing multiple ongoing data sessions.

In one such embodiment, each virtual bus interface further includes one or more "sessions" which are a persistent and/or semi-persistent set of data transactions (e.g., datagrams) between two logical endpoints. In some implementations, the session may include "stateful" transactions (i.e., the data transactions are based on a current state of the session), and/or "stateless" transactions (i.e., the data transactions are not based on a current state of the session).

Exemplary Run Time Processing

Figure 3:
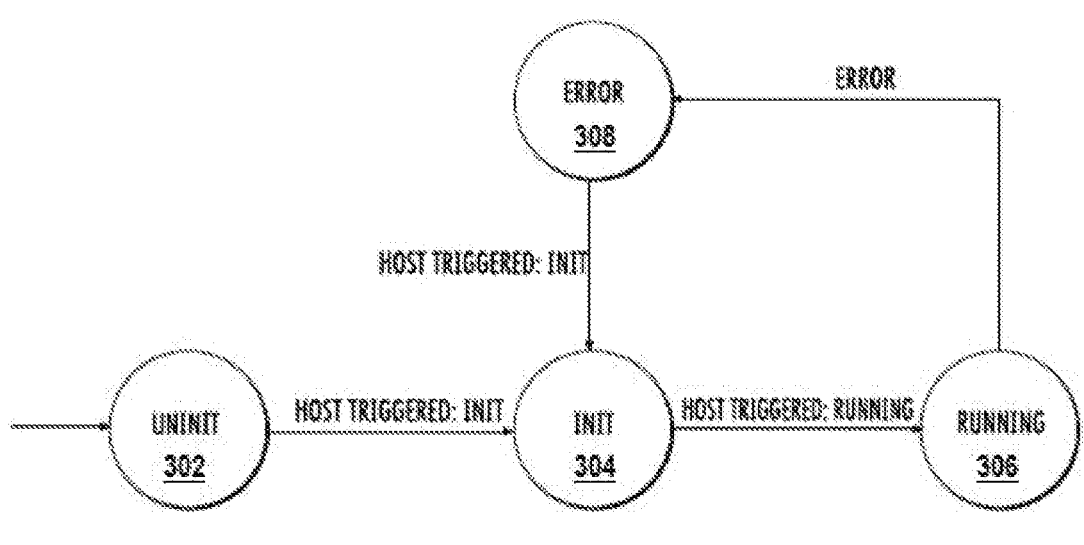
FIG. 3 is a logical block diagram of an exemplary run time operation state machine useful in conjunction with the various described embodiments.

In one aspect, the aforementioned computer readable instructions, when executed by at least one of the first or second processors (102A, 102B) are configured to transact data via a run-time processing protocol that is based on a shared memory architecture. FIG. 3 illustrates one exemplary embodiment of a run-time IPC state machine 300. In the exemplary embodiment, the first and second processor share a shared memory interface that includes a memory mapped input/output (MMIO) space.

The state machine comprises four (4) states in the illustrated embodiment; i.e., an UnInit state 302, an Init state 304, a Running state 306, and an Error state 308. In one exemplary variant, the four (4) states are controlled by two registers in the MMIO: IPC Status, and IPC Control. IPC Status is read-only for the host processor and read/write for the peripheral processor and reflects the peripheral processor's IPC state machine. IPC Control is write-only for the host and read-only for the peripheral processor. IPC Control allows the host processor to trigger IPC state machine transitions. Writing to IPC Control triggers an interrupt for the peripheral processor.

In the exemplary embodiment of FIG. 3, the run-time IPC state machine starts in the UnInit state 302 (e.g., a default state from reset, power-down, power-off, etc.) When the host processor writes an initialize command to the IPC Control register, the state machine changes to the Init state 304. Responsively, the peripheral processor sets up and initializes its local data structures, and updates the IPC Status register to signal that the Init state 304 has completed. In some embodiments, the peripheral processor may additionally notify the host processor (e.g., with a message signaled interrupt (MSI) i.e., a PCIe-based mechanism that allows the peripheral processor to send an interrupt to the host processor). Concurrently, the host processor can initialize its own data structures; when the host processor receives the notification, it checks the IPC Status register to detect the completed change to Init state 304.

From the Init state 304, the host processor updates the shared memory interface (e.g., the MMIO register Context Information Address) and triggers the transition to the Running State 306 by writing a run command to the IPC Control register. Responsively, the peripheral processor reads the Context Information and updates the IPC Status register to "Running".

As described in greater detail hereinafter, in the Running state 306, data transfers can take place between the host and the peripheral processor; however, in the event of an error condition on either the host or the peripheral processor, the IPC state machine transitions to the Error State 308. The host informs the peripheral processor of an error by writing an error flag to the IPC Control register. In contrast, the peripheral processor informs the host processor of an error (internal or host initiated), by updating the IPC Status register to Error.

From the Error state 308, the peripheral processor clears its current Context Information Address and terminates further host memory access. In some cases, the peripheral processor may store a mirror copy of a few critical peripheral processor registers; i.e. Execution Stage Mirror and IPC Status Mirror, in the host memory (in a location specified for device information). Once the peripheral processor has the device information address, it updates the mirror copy of these registers in host memory each time the local register changes, followed by a MSI. The IPC Status Mirror is updated by the peripheral processor as part of the Running and Error States (306, 308).

Referring back to the Running state 306 of FIG. 3, in one exemplary embodiment, data transfers are performed as a series of data transactions over unidirectional "pipes". A pair of pipes creates a bi-directional interface. While the following discussion is provided within the context of a "full-duplex" scheme, those of ordinary skill in the related arts will readily appreciate that the described protocols may be substituted with equal success with so-called "half duplex" schemes.

In one exemplary embodiment, a client service (e.g., control, data, trace, etc. associated with a data session) is associated with a single interface i.e., a pair of pipes. Each client service input/output (I/O) may be composed of multiple so-called "transfer descriptors" (TD). For example, a single TD may describe a physically contiguous memory buffer, accessible by the host/peripheral processor over the communication link.

Each pipe (i.e., data stream) is associated with one "transfer descriptor ring" (TDR). The TDR data structure resides in host processor memory and is accessible by the peripheral processor. Each TDR is described by a head pointer and a tail pointer, and encompasses one or more TD; each TD includes: an address of a buffer in host memory, a size of the buffer, a next count that indicates the number of TDs remaining in an I/O transfer, and a completion status. The head pointer points to the next empty slot in the TDR, whereas the tail pointer points to the address of next TD which the peripheral will process. The head pointer is written by the host and read by the peripheral. The tail pointer is read by the host and written by the peripheral. All TDs and associated data buffers between the tail pointer and the head pointer are associated with the peripheral processor. When the head pointer is equal to the tail pointer, the TDR is empty.

The peripheral processor provides an array of so-called "doorbell" registers, and a so-called "head pointer doorbell array" (HPDA) which is further indexed by pipe number. The host processor notifies the peripheral processor of a new TD in a TDR by writing the head pointer value in the doorbell register at a pipe number offset inside the HPDA.

Similarly, the host provides a so-called "tail pointer array" (TPA) in host memory that is indexed by pipe number, which is updated by the peripheral processors with tail pointer values to indicate completion of a TD.

The TDR is valid while the pipe is open or enabled. Pipes can be opened or closed based on appropriate messaging. For example, in one such implementation, an Open Message provides the address of the TDR and its size, whereas a Close Message completion may "reap" the TDR (e.g., enabling the data to be overwritten or allocated to other purposes, etc.). When a pipe is not open, its corresponding values within the TPA and HPDA are not relevant (or otherwise disregarded).

In one aspect, the host processor controls the state of the pipe via a messaging data structure. In one exemplary embodiment, the messaging data structure is queued according to a message ring (MR), which operates in a manner similar to the aforementioned TDR. Specifically, the MR is described by a message tail pointer (MTP), a message head pointer (MHP), and a message head pointer doorbell (MHPD). When initializing the IPC state machine, the processor configures the MR, and sets the MR base address in the MTP, and update context information which is configured to cause the peripheral processor to read the MR base address in the MHPD and transition the Run Time IPC State Machine of FIG. 3 to the Running State 306. Thereafter, the host can transact messages with the peripheral processor.

During run time operation, every time the host has a new message to send, it checks whether there is space in the MR for a message request. If so, a new message entry is created at the MHP and the head pointer value is updated. The new head pointer value is written to the MHPD. When the peripheral processor has consumed the message, it updates the status of the message and then updates the MTP. Additionally, the peripheral processor sends an MSI.

Various other modifications and/or permutations of the TD, TDR, and MR data structures and transactions may be made by one of ordinary skill.

While the peripheral processor is passive in regards to opening and closing various pipes, in conditions where the host processor is in a lower power state (e.g., awake-low power, sleep-low power, etc.), the peripheral processor may "wake" the IPC layer, in order that the IPC layer may further "wake" the host processor for enabling and/or opening of a pipe specified by the peripheral processor, or for transferring data from the peripheral to the host processor via an enabled pipe.

Exemplary Power Management Scheme

As a brief aside, existing PCIe implementations support a so-called "standby" or "sleep" mode (e.g., an awake-low power state, a sleep-low power state, etc.). However, the existing PCIe sleep mode operation was designed for personal computer implementations which have sleep states that are less involved than techniques used in e.g., typical cellular phone devices, tablets, etc. Accordingly, existing PCIe specifications mandate an exit latency that is much shorter than the actual exit latency that most cellular devices can support (an unresponsive peripheral processor would cause the host fabric to hang). In view of the limitations of existing PCIe implementations, the disclosed IPC enabled host and peripheral processors independently track and control sleep mode operation so that the shared memory interface (MMIO) can be "gated off" during sleep mode operation until the sleeping processor wakes up (i.e., switches from a lower power state to a higher power state).

In one embodiment, the computer readable instructions, when executed by at least one of the first or second processors (102A, 102B) is configured to perform power management. In one exemplary implementation, power management between the two independent processors is configured according to a sleep message (e.g., a power state message). One such sleep message contains: (i) a target field that indicates which processor (e.g., host or peripheral) the message is directed to, (ii) a state field that triggers the appropriate processor state machine to enter or exit a sleep mode (e.g., a sleep-low power state, an awake-low power state, etc.), (iii) a type field which identifies the message type, and (iv) a completion status field which indicates whether the sleep message is succeeded or failed. It will be appreciated that other configurations (including less or more fields, and/or different ordering thereof) may be used consistent with the various aspects of the present disclosure.

When the host is ready to enter sleep, it informs the peripheral processor via a Host Enter Sleep Message, and the host may transition to sleep mode; thereafter, the peripheral processor may also independently enter sleep mode. If the peripheral processor needs to reestablish communication with host, it can request the host to wake-up via one or more of the built-in or out-of-band mechanisms described herein, which triggers "wake" (e.g., switching from a lower power state to a higher power state) of the IPC layer and subsequently "wake" of the host processor. Once the host processor has woken, the host updates the peripheral with a Host Exit Sleep Message.

In some examples, if an error occurs in reestablishing communication between the peripheral processor and the host processor (e.g., unsuccessful downlink data packet transfer over the specified pipe, unsuccessful wake of the host processor, etc.), the peripheral processor may continuously or repeatedly request IPC layer and/or host "wake", thereby preventing one or more of the IPC layer, the host processor, and the peripheral processor from returning to a lower power state and increasing overall power consumption of the device. Thus, it is desirable in certain applications that the peripheral processor include a "wake-limiting" procedure to prevent continuous and/or repeated "wake" requests to the IPC layer and the host processor from the peripheral processor.

Exemplary Power Management Error Handling Scheme

In one aspect, the computer readable instructions, when executed by the peripheral processor (102B) are configured to limit the number of "wake" requests to the IPC layer and the host processor from the peripheral processor.

In one embodiment, the peripheral processor includes a wake-limiting procedure, which prevents continuous and/or overly repetitive "wake" requests from the peripheral processor. As described herein, an energy cost associated with switching from the sleep-low power state to the awake-high power state may be greater than an energy cost associated with switching from the awake-low power state to the awake-high power state. Accordingly, the IPC wake-limiting procedure may include first identifying a state of the host processor (e.g., the AP). Based on the current state of the host processor, the peripheral processor may then limit the number of wake requests to the host processor for optimization of power consumption.

Specifically, in a condition where the host processor switches to or is in the awake-low power state, existing or new downlink data packets are detected on an enabled/ opened pipe, and the host processor has initiated a read transaction on the pipe, the host processor is switched to the awake-high power state, and the downlink data transfer is executed. Alternatively, in a condition where the host processor switches to or is in the sleep-low power state and existing or new downlink data packets are detected on an enabled/opened pipe, the peripheral processor is limited to a specified number of wake requests to the host processor for transferring of the data. Thus, the exemplary wake-limiting procedure may prevent continuous power consumption by the peripheral processor, the IPC layer, and/or the host processor caused by a transfer error (e.g., downlink data packet transfer error).

Methods

Various methods may be executed by apparatus 100 for managing power during normal operating conditions and during operating conditions where the host processor is entering or is in a lower power state (e.g., awake low-power states, sleep-low power states, etc.) to limit the number of "wake" requests received from the peripheral processor. The apparatus 100 may include integrated circuitry configured to implement "intelligent" power and state management. The integrated circuitry includes one or more semiconductive die with digital processor apparatus disposed thereon and configured to communicate with one or more other integrated circuit devices within a common platform (e.g., mobile wireless device).

Figure 4:
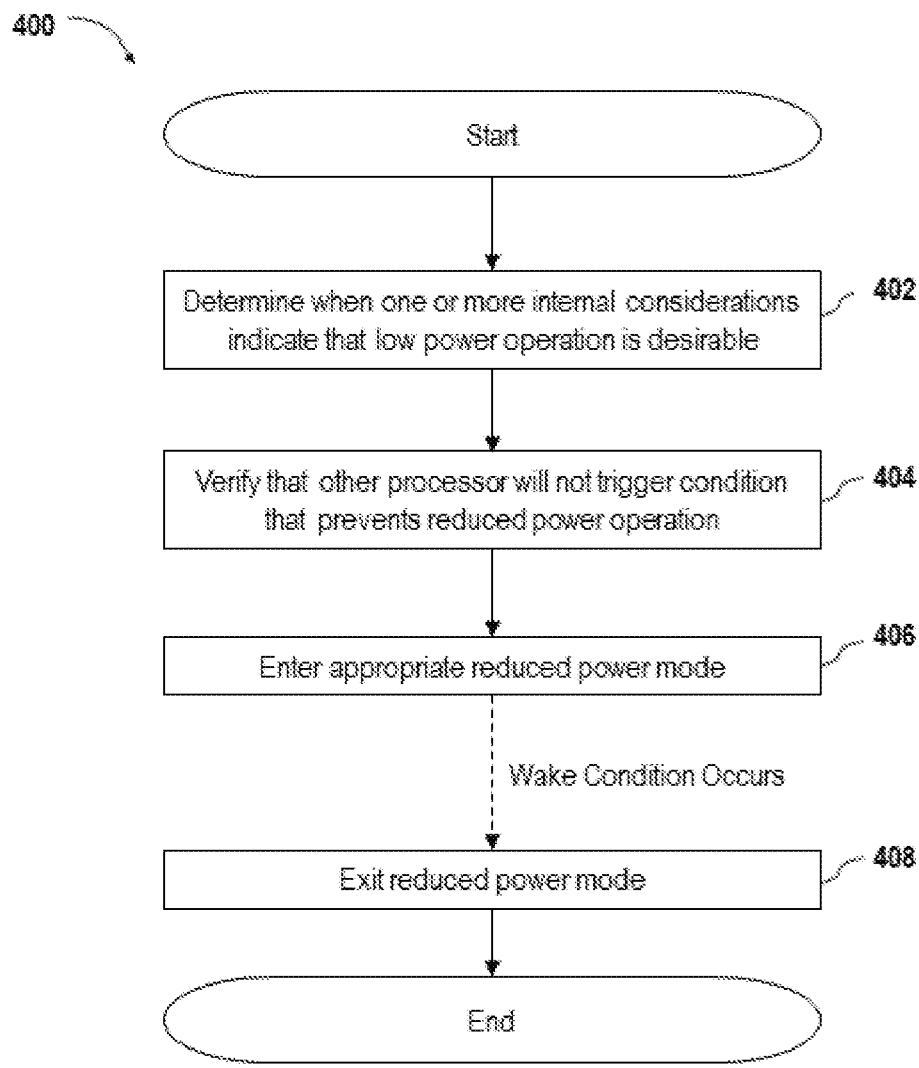
FIG. 4 is a logical flow diagram illustrating an exemplary embodiment of a power management process for independently operable processors, in accordance with the present disclosure.

FIG. 4 is a logical flow diagram illustrating an exemplary embodiment of a power management method 400 for independently operable processors during normal operating conditions.

As a brief aside, processor power consumption is affected by a plethora of factors such as memory use, voltage, clock frequency, etc. Metrics for power consumption typically incorporate computational efficacy; for example, in the computing arts, performance can be benchmarked as number of compute cycles per watt consumed. Accordingly, in various described embodiments, when the relative processing performance is low relative to the amount of power consumed (or based on other considerations), the various processors will prefer to operate in lower power states. Within this context, artisans of ordinary skill, given the contents of the present disclosure, will readily appreciate that there are a plethora of actions and/or transactions which can be initiated by another processor which require action on the part of the processor. More directly, the present disclosure recognizes that the processor must consider one or more other processor activities in order to properly assess the optimal power strategy. Thus, the processor's determined preference for low power operation must in many cases be balanced against the considerations of the system as a whole.

At step 402 of the method 400, a processor determines when one or more internal considerations indicate that low power operation may be desirable. In one exemplary embodiment, the processor monitors its current processing load; when the processing load falls below a minimum threshold, the processor flags an opportunity to reduce power consumption.

More complex embodiments may incorporate multiple processor-specific factors; for example, such factors may include e.g., the processor's state machine, historic processing burden, anticipated processing burden, etc. Historic processing burden and/or anticipated processing burden may be based for example on an analysis of a histogram of processing activity, and/or software execution which correlates with power consumption. For instance, the presence of a pending data transfer (e.g., a DMA access) may indicate that the processor should pre-emptively prepare for active mode operation. Similarly, the presence of a cache miss may signal that the processor has an opportunity to sleep while data is fetched from less accessible memory (e.g., a disk drive, etc.).

Those of ordinary skill in the related arts will readily appreciate that certain applications may be adversely affected by performance losses that are attributable to excessive power optimization. Similarly, some users prefer performance over power consumption, or vice versa. Still further, some manufacturers prefer to ensure a minimum performance or maximum power consumption so as to provide a certain product experience to consumers. Accordingly, certain embodiments of the present disclosure may additionally prioritize processor performance and/or power consumption against other considerations (e.g., user experience, latency, etc.). In some cases, priorities may be dynamically evaluated and even altered.

In some implementations of the present disclosure, one or more relevant parameters are stored via dedicated hardware registers and/or hardware logic, etc. For example, user preferences and/or manufacturer preferences may be stored within dedicated non-architectural registers and/or configured within logic. In other examples, the relevant parameters may be stored within memory (e.g., BIOS), or otherwise virtualized. For example, a state machine may be implemented as a virtualized machine (e.g., the states, inputs, outputs, etc. are stored within memory). In some cases, the relevant parameters are stored via a memory mapped memory space such that other processors may freely access the processors parameters (for the other processor's own consideration, as discussed infra). Common examples of relevant parameters may include for example, processing metrics, historic processing burden, indicia of predicted load, etc.

At step 404 of the method 400, the processor verifies that another processor(s) has not and/or will not trigger a condition that prevents reduced power operation. As previously noted, in some conditions, transactions via the inter-processor communications link can result in a wake event. In other conditions, it may be advantageous to limit the number of transactions and prevent excessive power consumption caused by repeatedly waking the processor from a lower power state.

In some embodiments of the present disclosure, the processor retrieves one or more relevant parameters associated with another processor that are stored via dedicated hardware registers, hardware logic, memory mapped memory space, etc. Based on the one or more relevant parameters, the processor can determine the current state and/or predict the future activity of the other processor. In this manner, the processor can intelligently determine when to transition into/out of lower power states.

In some implementations, a system of processors may incorporate a power controller which tracks the power state of each of the processors of the system (as well as other potentially relevant considerations, such as thermal design power (TDP) margin or the like). In these centralized power controller systems, the processor may be able to determine the current power state of each of the other processors by reading the contents of the power controller. For example, in one such exemplary embodiment, the power controller is mapped to a dedicated portion of the memory map.

In one implementation, based on the foregoing considerations of (i) the processor's load, and (ii) the other processor's current and/or anticipated traffic, the processor determines whether a reduced power mode is appropriate and if so, enters the appropriate reduced power mode (step 406).

In some embodiments, the processor must receive an acknowledgement or instruction before it can transition to the reduced power mode. In one such variant, the host processor (or other power controlling entity) uses a sleep message to control sleep of the host and peripheral processor. An exemplary sleep message may include, without limitation: a target that indicates which processor the message is targeting, a state that identifies the reduced power mode (e.g., active or sleep state), and/or a type that is used to uniquely identify the message. In some cases, the peripheral processor may additionally respond with a sleep response message that includes a status to indicate success or failure.

For example, where the host processor transmits a sleep message to the peripheral processor having the target field set to the peripheral processor, then the peripheral processor will responsively enter or exit sleep mode in accordance with the sleep message. Where the host processor transmits a sleep message to the peripheral processor having the target field set to the host processor, then the peripheral processor may accept the information as merely information with regard to the host processor's current state.

In related embodiments, the processor additionally notifies the other processor(s) of its reduced power mode. In one exemplary implementation, the notification includes writing to a location in a shared memory mapped interface and issuing an interrupt that indicates the status update.

In other implementations, the notification may be implemented via register writes, dedicated signaling, interrupt signaling, out-of-band signaling, etc. Still other implementations may not notify the other processor; the other processor(s) may infer the status of the reduced power processor, or alternatively query the reduced power processor state (via a polling process, etc.) In systems with a centralized power controller, the processor may provide its power state information to the power controller; subsequently thereafter, other processors can determine the state of the processor by querying the power controller. Still other schemes will be readily appreciated by those of ordinary skill in the related arts, given the contents of the present disclosure.

In an exemplary embodiment, the processor's state is controlled by a state machine having at least one sleep state, and at least one active state. The state machine may provide an active state (e.g., an awake-high power state), a reduced power state (e.g., a sleep-low power state), and two transitionary states (e.g., awake-low power states). However, it is appreciated that the various aspects of the present disclosure are readily applicable to more complex schemes which may include multiple power states having different associated power consumptions, capabilities, and/or performances associated therewith, etc. Common examples of reduced power states include without limitation, states that reduce the voltage and/or frequency of signaling and/or clocks, states that selectively enable or disable circuitry, states that selectively enable or disable interfaces, etc.

In an exemplary embodiment, the reduced power notification may include additional information to assist other processors in maximizing performance. Common examples of such information includes without limitation: a minimum or maximum sleep time, an indication of the reduced power state (where there are multiple states), an indication of the wake-up latency, a starting time stamp, etc. For instance, before waking the host processor, the peripheral processor may evaluate the amount of time that has elapsed since the host processor has powered down (longer sleep times represent more power savings). Moreover, for non-urgent traffic, the peripheral processor may buffer time-insensitive data before waking the host processor. Still further, the peripheral processor can consider the wake-up latency so as to start the wake process with enough lead time to minimize overall performance impact for time critical transactions. Various other optimizations may be substituted with equal success, such other optimizations recognized by those of ordinary skill given the contents of the present disclosure.

Figure 5:
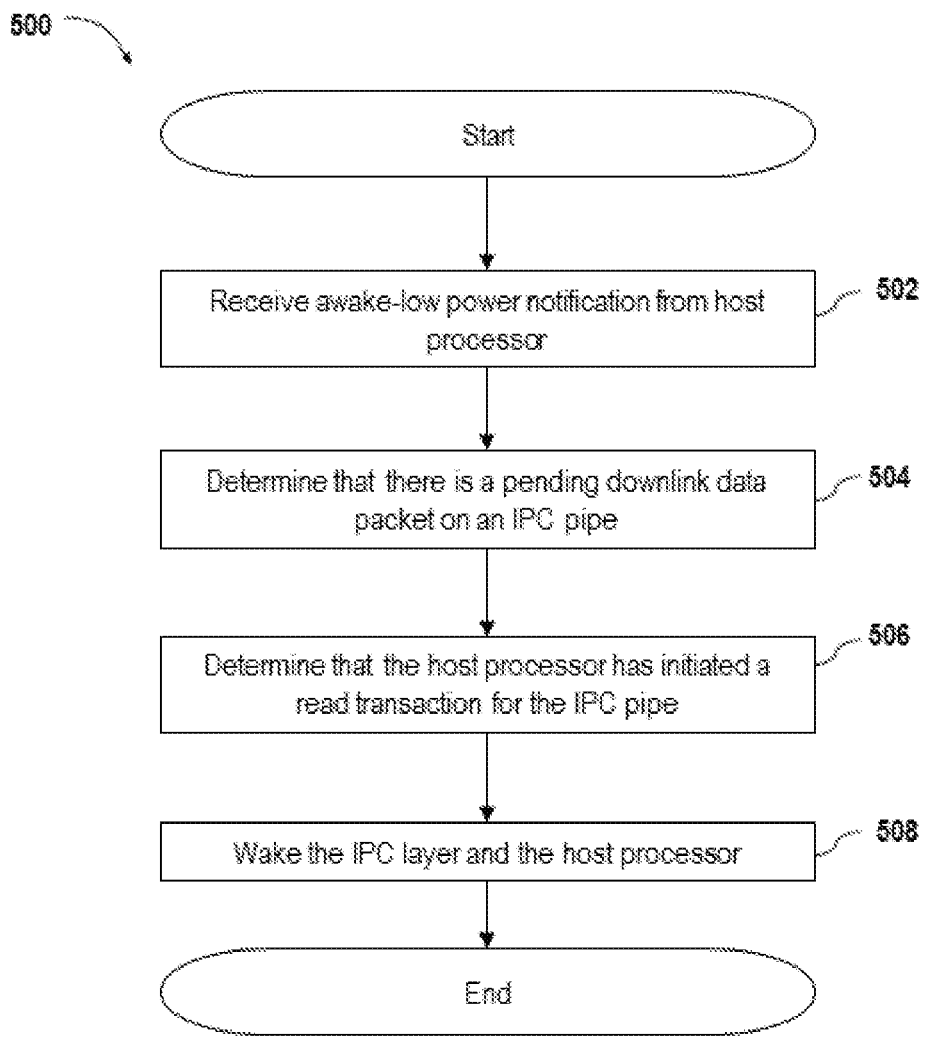
FIG. 5 is a logical flow diagram illustrating an exemplary embodiment of a power management process for independently operable processors in a condition where the host processor switches to a lower power state, in accordance with the present disclosure.

In a related aspect, when the host processor sends reduced power notifications (e.g., notification of switch from an awake-high power state to an awake-low power state, notification of switch from an awake-low power state to a sleep-low power state, etc.), the peripheral processor may determine whether or not to "wake" the host processor. Turning now to FIG. 5, a flow diagram illustrates a first exemplary method 500 for determining permissive "wake" of the host processor from an awake-low power state to an awake-high power state by activity on another processor (e.g., a peripheral processor).

The method 500 may be executed when the host processor enters a lower power state. At step 502, the peripheral processor receives a notification that the host processor is switching to an awake-low power state.

At step 504, the peripheral processor determines that there is a pending downlink data packet on an IPC pipe. In one implementation, this is accomplished by determining that the TDR or other data buffer associated with the IPC pipe is not empty and contains data for downlink transfer.

Next, at step 506, the peripheral processor determines that the host processor has initiated a read transaction for the IPC pipe. At step 508, the peripheral processor wakes the IPC layer and the host processor to perform the data transfer. In accordance with the method 500, the IPC layer and the host processor wakes up only when the host processor has initiated a read transaction for an IPC pipe.

Figure 6:
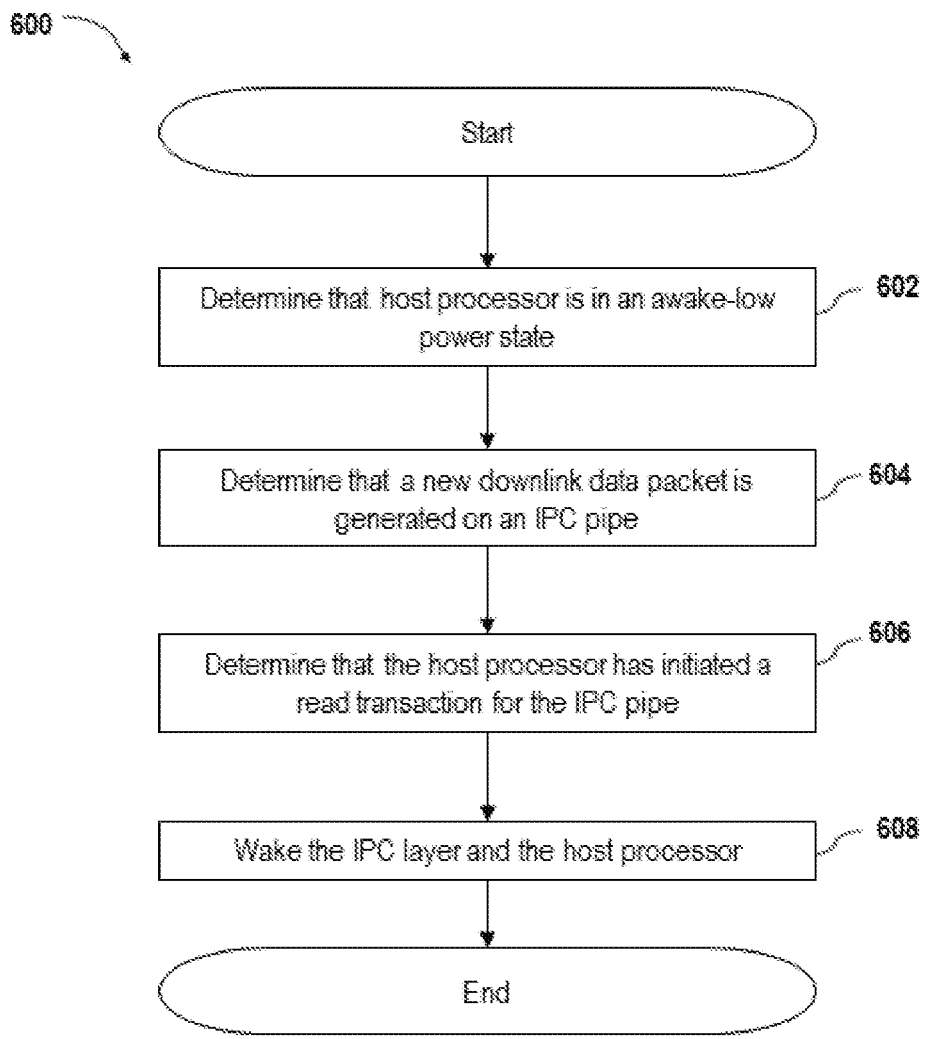
FIG. 6 is a logical flow diagram illustrating an exemplary embodiment of a power management process for independently operable processors in a condition where the host processor is in a lower power state, in accordance with the present disclosure.

FIG. 6 includes a flow diagram illustrating a second exemplary method 600 for determining permissive "wake" of the host processor from an awake-low power state to an awake-high power state by activity on another processor (e.g., a peripheral processor). In the illustrated embodiment, the method 600 is executed when a new downlink data packet is generated, and the host processor is in an awake-low power state.

At step 602, the peripheral processor determines that the host processor is in an awake-low power state. In one implementation, this is accomplished by determining that the last sleep message received from the host processor was a message indicating that the host processor was entering into the awake-low power state.

At step 604, the peripheral processor determines that a new downlink data packet is generated on an IPC pipe. In one implementation, this is accomplished by detecting that the number of TDs in the TDR associated with the IPC pipe has been incremented. This indicates that a new TD has been allocated to the new downlink data packet.

At step 606, the peripheral processor determines that the host processor has initiated a read transaction for the IPC pipe. In one implementation, this is accomplished by determining that the host processor has previously issued a read request to the peripheral processor for any subsequent data placed onto the IPC pipe for transfer over to the host processor.

At step 608, the peripheral processor wakes the IPC layer and the host processor. In one implementation, this is accomplished by sending an interrupt (e.g., a MSI) to the host processor. In accordance with the method 600, the IPC layer and the host processor wakes up only when the host processor has initiated a read transaction for the IPC pipe having the newly generated downlink data packet.

Figure 7:
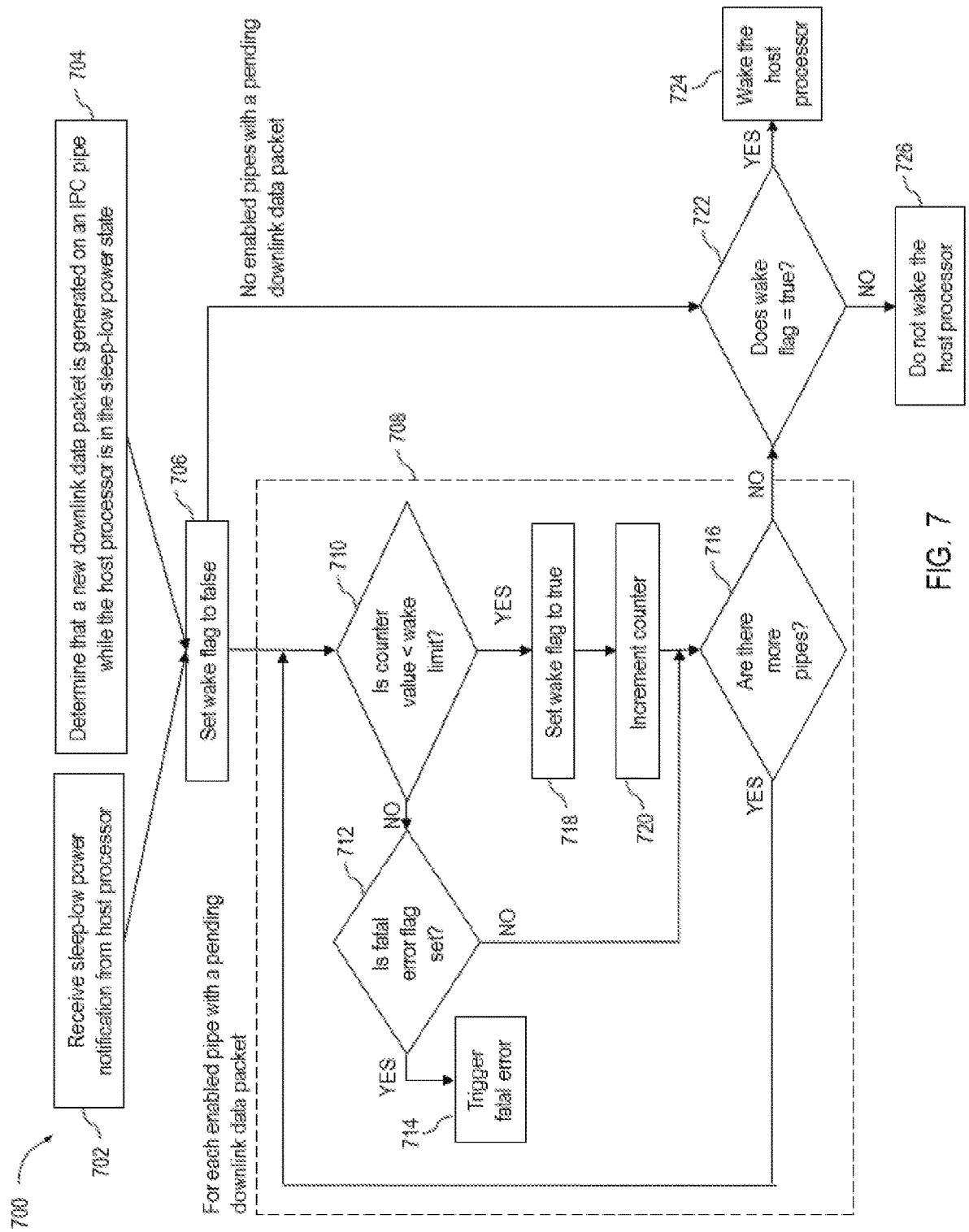
FIG. 7 is a logical flow diagram illustrating an exemplary embodiment of a power management process for a wake-limiting procedure, in accordance with the present disclosure.

FIG. 7 includes a flow diagram illustrating an example of operations 700 of a wake-limiting procedure performed by a peripheral processor in order to limit power consumption by the IPC link, the peripheral processor, and/or the host processor due to continuous and/or repeated wake requests from the peripheral processor. The wake-limiting procedure is executed when the host processor enters a sleep-low power state or when a new downlink data packet is generated on an enabled IPC pipe while the host processor is in the sleep-low power state.

Each downlink IPC pipe is associated with a wake-limiting counter and a pre-defined wake limit threshold. The wake limit threshold indicates the maximum number of permissible "wakes" of the host processor by the peripheral processor each time a new downlink data packet is generated on the IPC pipe while the host processor is in the sleep-low power state or each time a downlink data packet has been transferred to the host processor over the IPC pipe. The predefined wake limit threshold for an IPC pipe may be configured by the host processor at runtime or it may be hard-coded in the peripheral processor at compile time. If the number of wakes of the host processor exceeds the wake limit threshold, the peripheral processor is no longer permitted to wake the host processor until the wake-limiting counter is reset to zero. The wake-limiting counter for each IPC pipe may be reset to zero in conditions where: (i) the IPC pipe becomes enabled by the host processor, (ii) a new downlink data packet is generated on the IPC pipe, or (iii) the existing downlink data packet is successfully transferred to the host processor.

Each downlink IPC pipe may be associated with e.g., a fatal error flag that indicates whether exceeding the wake limit is treated as a fatal error. The fatal error flag may be for instance configured by the host processor at runtime, or it may be hard-coded in the peripheral processor at compile time. When a fatal error is triggered by an IPC pipe exceeding its wake limit, the device may take any appropriate action for handling the fatal error, such as resetting the host processor and/or the peripheral processor.

To determine whether to permit waking of the host processor, the peripheral processor checks whether there are any downlink packets pending on any enabled IPC pipes. Any such pipe is a wake-eligible pipe. The peripheral processor is permitted to wake the host processor when the wake-limiting counter is less than the wake limit threshold for any wake-eligible pipe. If the wake-limiting counter is not less than the wake limit threshold for any wake-eligible pipe and the fatal error flag is set, the peripheral processor triggers a fatal error to be handled by the device. If the peripheral processor determines that wake is permitted, the peripheral processor increments the wake-limiting counter for each wake-eligible pipe if it is less than the wake limit threshold.

As shown in FIG. 7, the peripheral processor receives a sleep-low power notification from the host processor (at step 702); or, while the host processor is in the sleep-low power state, the peripheral processor determines that a new downlink data packet is generated on an IPC pipe (at step 704). In response to step 702 or step 704 occurring, the peripheral processor sets the wake flag to "false" at step 706.

During process flow 708, the peripheral processor checks the wake-limiting counter for each enabled pipe with a pending downlink data packet. At step 710, the peripheral processor determines whether the value of the wake-limiting counter is less than the wake limit threshold. If the value of the counter is not less than the wake-limiting threshold, the peripheral processor determines whether the fatal error flag is set at step 712. If the fatal error flag is set, the peripheral processor triggers a fatal error at 714. Otherwise, the peripheral processor determines whether there are more pipes to check at step 716.

If at step 710, the peripheral processor determines that the value of the counter is less than the wake limit threshold, the peripheral processor sets the wake flag to "true" at step 718 and increments the wake-limiting counter at step 720. The peripheral processor then determines whether there are more pipes to check at 716.

If the peripheral processor determines that there are more enabled pipes with a pending downlink data packet at step 716, the peripheral processor repeats the process flow 708 for the next such pipe. Otherwise, the peripheral processor determines whether the wake flag is set to "true" at step 722. If the wake flag is set to "true", the peripheral processor wakes the host processor at step 724. Otherwise, the peripheral processor is not permitted to wake the host processor at step 726.

Returning to FIG. 4, thereafter, when one or more of the "wake" conditions described supra occurs, the processor exits the reduced power mode and may send a "wake" notification (step 408). Further, transfer of downlink and/or uplink data packets may occur between the host processor and the peripheral processor.

Figure 8A:
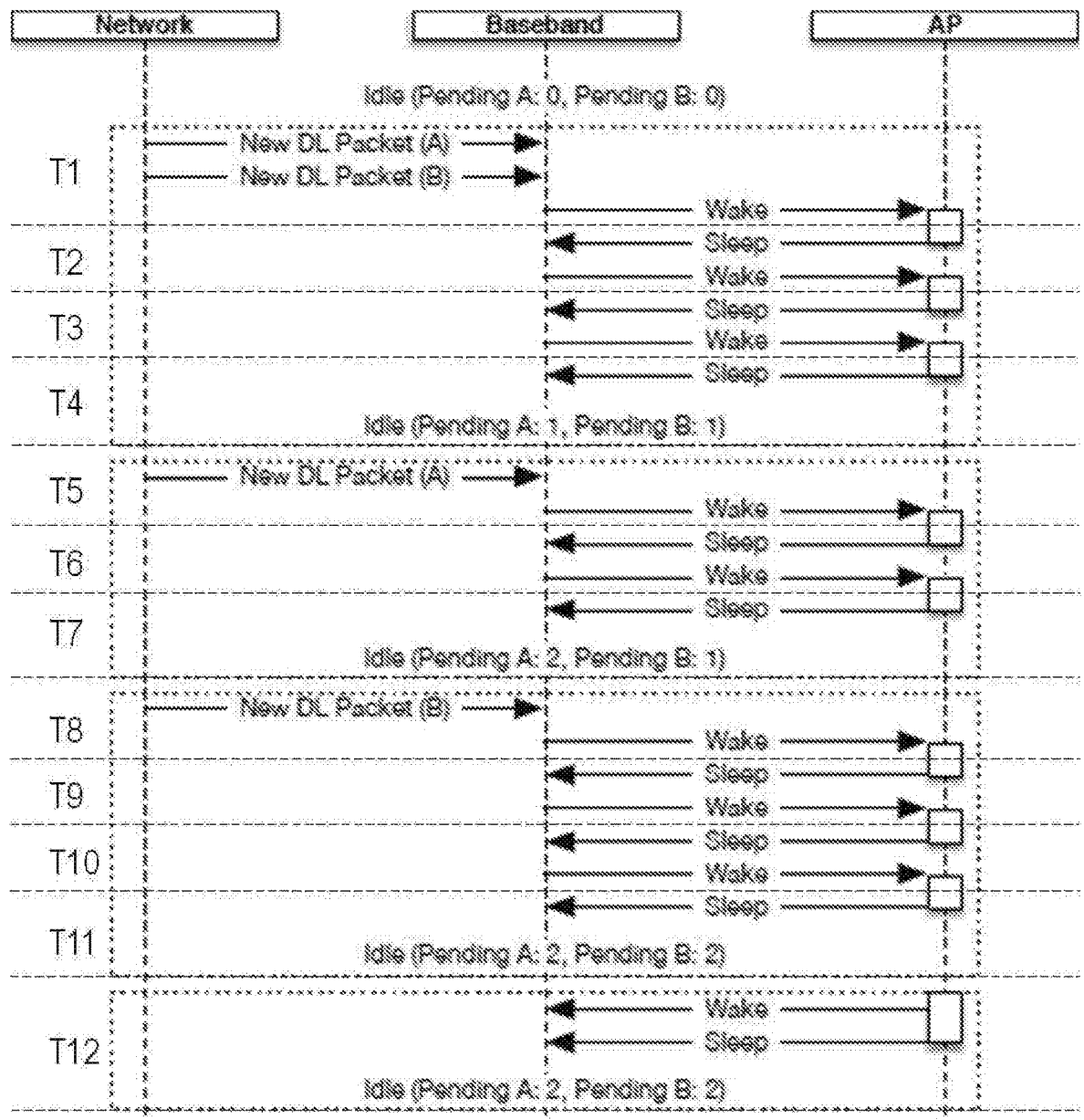
FIGS. 8A and 8B are data flow diagrams illustrating communications between a peripheral device and a host processor during a wake-limiting Procedure, in accordance with one implementation of the present disclosure.
Figure 8B:
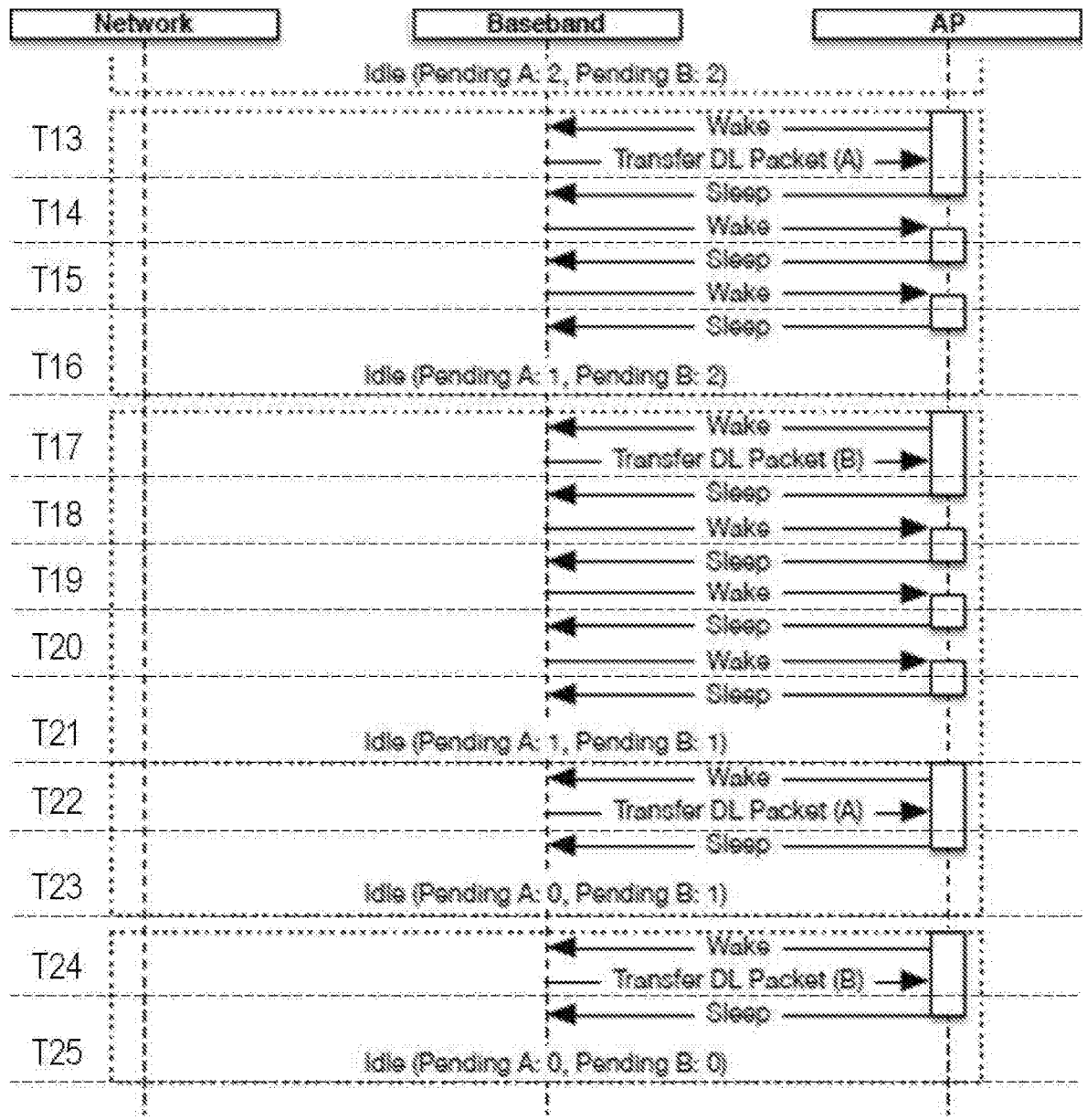

FIGS. 8A and 8B are data flow diagrams illustrating examples of communications between a peripheral device, e.g., a baseband processor, and a host processor, e.g., an AP, during a Wake-Limiting Procedure. For the examples of FIG. 8, IPC pipes A and B are enabled for transferring data between the baseband processor and the AP. The baseband processor may be e.g., a cellular or Wi-Fi peripheral processor that is in data communication with a network. In the examples of FIG. 8, the IPC pipe A may be used to transfer, e.g., cellular data, and has a wake-limit of two (2). The IPC pipe B may be used to transfer, e.g., control data, and has a wake-limit of three (3). Neither IPC pipe A nor IPC pipe B has the fatal error flag set; any pending downlink packets are held by the baseband processor until the packet is transferred to the AP.

"Wake" requests are communicated from the baseband processor to the AP to wake the AP into an awake-high power state. "Sleep" notifications are communicated from the AP to the baseband processor when the AP switches to a sleep-low power state. The data flow of FIG. 8 will be described in conjunction with the operations 700 of FIG. 7.

During a period of time T1, the AP is in a sleep-low power state, and the values of the wake-limiting counters for IPC pipes A and B are zero (0). The baseband processor receives new downlink data packets from the network and places the new packets on IPC pipes A and B pending transfer to the AP (step 704), which causes the baseband processor to perform the operations 700 of the wake-limiting procedure. The baseband processor sets the wake flag to "false" (step 706) and performs the operations in the process flow 708 for each of pipes A and B.

For pipe A, the baseband processor checks the value of the pipe A's wake-limiting counter (step 710). The value of pipe A's wake-limiting counter is zero, which is less than pipe A's wake limit threshold of two. The baseband processor sets the wake flag to "true" (step 718) and increments pipe A's wake-limiting counter to one (step 720). The baseband processor determines that pipe B has a pending downlink data packet (step 716), and performs the operations in the process flow 708 for pipe B.

For pipe B, the baseband processor checks the value of the pipe B's wake-limiting counter (step 710). The value of pipe B's wake-limiting counter is zero, which is less than pipe B's wake limit threshold of three. The baseband processor sets the wake flag to "true" (step 718), and increments pipe B's wake-limiting counter to one (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T2, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is one, which is less than pipe A's wake limit threshold of two. The baseband processor sets the wake flag to "true" (step 718) and increments pipe A's wake-limiting counter to two (step 720). The baseband processor determines that pipe B has a pending downlink data packet (step 716) and performs the operations in the process flow 708 for pipe B.

For pipe B, the baseband processor checks the value of the pipe B's wake-limiting counter (step 710). The value of pipe B's wake-limiting counter is one, which is less than pipe B's wake limit threshold of three. The baseband processor sets the wake flag to "true" (step 718) and increments pipe B's wake-limiting counter to two (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T3, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). In this example, the value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is two, which is less than pipe B's wake limit threshold of three. The baseband processor sets the wake flag to "true" (step 718) and increments pipe B's wake-limiting counter to three (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T4, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T4, each of pipes A and B has a pending downlink packet to transfer to the AP.

During a period of time T5, the AP is in the sleep-low power state, and the baseband processor receives a new downlink data packet from the network for transfer to the AP over pipe A. In response to receiving the new downlink data packet for transfer over pipe A, the baseband processor resets the wake-limiting counter for pipe A to zero and places the new packet on pipe A pending transfer to the AP (step 704), which causes the baseband processor to perform the operations 700 of the wake-limiting procedure. The baseband processor sets the wake flag to "false" (step 706) and performs the operations in the process flow 708 for each of pipes A and B (pipe B still has a pending data transfer to the AP).

For pipe A, the baseband processor checks the value of the pipe A's wake-limiting counter (step 710). The value of pipe A's wake-limiting counter is zero, which is less than pipe A's wake limit threshold of two. The baseband processor sets the wake flag to "true" (step 718) and increments pipe A's wake-limiting counter to one (step 720). The baseband processor determines that pipe B has a pending downlink data packet (step 716) and performs the operations in the process flow 708 for pipe B.

For pipe B, the baseband processor checks the value of the pipe B's wake-limiting counter (step 710). The value of pipe B's wake-limiting counter is three (because it was not reset), which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T6, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is one, which is less than pipe A's wake limit threshold of two. The baseband processor sets the wake flag to "true" (step 718) and increments pipe A's wake-limiting counter to two (step 720). The baseband processor determines that pipe B has a pending downlink data packet (step 716) and performs the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T7, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T7, pipe A has two pending downlink data packets to transfer to the AP, and pipe B has one pending downlink data packet to transfer to the AP.

During time period T8, the AP is in the sleep-low power state, and the baseband processor receives a new downlink data packet from the network for transfer to the AP over pipe B. In response to receiving the new downlink data packet for transfer over pipe B, the baseband processor resets the wake-limiting counter for pipe B to zero, and places the new packet on pipe B pending transfer to the AP (step 704), which causes the baseband processor to perform the operations 700 of the wake-limiting procedure. The baseband processor sets the wake flag to "false" (step 706) and performs the operations in the process flow 708 for each of pipes A and B.

For pipe A, the baseband processor checks the value of the pipe A's wake-limiting counter (step 710). The value of pipe A's wake-limiting counter is two (because pipe A's counter was not reset), which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is zero, which is less than pipe B's wake limit threshold of three. The baseband processor sets the wake flag to "true" (step 718) and increments pipe B's wake-limiting counter to one (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T9, the baseband processor receives a sleep notification from the AP (step 702), which causes the baseband processor to perform the operations 700 of the wake-limiting procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is one, which is less than pipe B's wake limit threshold of three. The baseband processor sets the wake flag to "true" (step 718) and increments pipe B's wake-limiting counter to two (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T10, the baseband processor receives a sleep notification from the AP (step 702), which causes the baseband processor to perform the operations 700 of the wake-limiting procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is two, which is less than pipe B's wake limit threshold of three. The baseband processor sets the wake flag to "true" (step 718) and increments pipe B's wake-limiting counter to three (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T11, the baseband processor receives a sleep notification from the AP (step 702), which causes the baseband processor to perform the operations 700 of the wake-limiting procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712), and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T11, pipe A has two pending downlink data packets to transfer to the AP, and pipe B has two pending downlink data packets to transfer to the AP.

During time period T12, the baseband processor receives a wake notification and then a sleep notification from the AP (step 702), which causes the baseband processor to perform the operations 700 of the wake-limiting procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712), and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T12, pipe A has two pending downlink data packets to transfer to the AP, and pipe B has two pending downlink data packets to transfer to the AP.

Referring to FIG. 8B, during time period T13, the AP switches from the sleep-low power state to the awake-high power state and sends a wake notification to the baseband processor. The AP then initiates a transfer of a pending downlink data packet on pipe A from the baseband processor to the AP, which causes the pending downlink data packet on pipe A to be transferred from the baseband processor to the AP. In response to a pending downlink data packet being transferred from the baseband processor to the AP over pipe A, the baseband processor resets the wake-limiting counter for pipe A to zero.

During a period of time T14, the baseband processor receives a sleep notification from the AP (step 702), which causes the baseband processor to perform the operations 700 of the Wake-Limiting Procedure. The baseband processor sets the wake flag to "false" (step 706) and performs the operations in the process flow 708 for each of pipes A and B (both pipes still have pending data to transfer to the AP).

For pipe A, the baseband processor checks the value of the pipe A's wake-limiting counter (step 710). The value of pipe A's wake-limiting counter is zero, which is less than pipe A's wake limit threshold of two. The baseband processor sets the wake flag to "true" (step 718) and increments pipe A's wake-limiting counter to one (step 720). The baseband processor determines that pipe B has a pending downlink data packet (step 716) and performs the operations in the process flow 708 for pipe B.

For pipe B, the baseband processor checks the value of the pipe B's wake-limiting counter (step 710). The value of pipe B's wake-limiting counter is three (because it was not reset), which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T15, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is one, which is less than pipe A's wake limit threshold of two. The baseband processor sets the wake flag to "true" (step 718) and increments pipe A's wake-limiting counter to two (step 720). The baseband processor determines that pipe B has a pending downlink data packet (step 716) and performs the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During a period of time T16, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T16, pipe A has one pending downlink data packet to transfer to the AP, and pipe B has two pending downlink data packets to transfer to the AP.

During time period T17, the AP switches from the sleep-low power state to the awake-high power state and sends a wake notification to the baseband processor. The AP then initiates a transfer of a pending downlink data packet on pipe B from the baseband processor to the AP, which causes the pending downlink data packet on pipe B to be transferred from the baseband processor to the AP. In response to a pending downlink data packet being transferred from the baseband processor to the AP over pipe B, the baseband processor resets the wake-limiting counter for pipe B to zero.

During time period T18, the baseband processor receives a sleep notification from the AP (step 702), which causes the baseband processor to perform the operations 700 of the Wake-Limiting Procedure. The baseband processor sets the wake flag to "false" (step 706) and performs the operations in the process flow 708 for each of pipes A and B.

For pipe A, the baseband processor checks the value of the pipe A's wake-limiting counter (step 710). The value of pipe A's wake-limiting counter is two (because pipe A's counter was not reset), which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is zero, which is less than pipe B's wake limit threshold of three. The baseband processor sets the wake flag to "true" (step 718) and increments pipe B's wake-limiting counter to one (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T19, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is one, which is less than pipe B's wake limit threshold of three. The baseband processor sets the wake flag to "true" (step 718) and increments pipe B's wake-limiting counter to two (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T20, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is two, which is less than pipe B's wake limit threshold of three. The baseband processor sets the wake flag to "true" (step 718) and increments pipe B's wake-limiting counter to three (step 720). The baseband processor determines that it has performed the process flow 708 for all enabled pipes with pending downlink data packets at step 716. The baseband processor checks the wake flag (step 722) and because the wake flag is "true", the baseband processor wakes the AP (step 724) by sending a wake request. In response to the wake request, the AP switches from the sleep-low power state to the awake-high power state. While the AP is in the awake-high power state, the AP may perform operations that do not include initiating transfers of the pending packets on pipes A and B.

During time period T21, the baseband processor receives a sleep notification from the AP (step 702), which causes the baseband processor to perform the operations 700 of the Wake-Limiting Procedure. The baseband processor sets the wake flag to "false" (step 706). Because both pipes A and B have pending downlink data packets to transfer to the AP, the baseband processor performs the operations in the process flow 708 for each of pipes A and B.

For pipe A, the baseband processor checks the value of the pipe A's wake-limiting counter (step 710). The value of pipe A's wake-limiting counter is two, which is not less than pipe A's wake limit threshold of two. The baseband processor then determines that pipe A's fatal error flag is not set (step 712) and that pipe B has a pending downlink data packet (step 716). The baseband processor proceeds with performing the operations in the process flow 708 for pipe B.

For pipe B, the baseband processor checks the value of the pipe B's wake-limiting counter (step 710). The value of pipe B's wake-limiting counter is three, which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T21, pipe A has one pending downlink data packet to transfer to the AP, and pipe B has one pending downlink data packet to transfer to the AP.

During time period T22, the AP switches from the sleep-low power state to the awake-high power state and sends a wake notification to the baseband processor. The AP then initiates a transfer of a pending downlink data packet on pipe A from the baseband processor to the AP, which causes the pending downlink data packet on pipe A to be transferred from the baseband processor to the AP. In response to a pending downlink data packet being transferred from the baseband processor to the AP over pipe A, the baseband processor resets the wake-limiting counter for pipe A to zero.

During a period of time T23, the baseband processor receives a sleep notification from the AP (step 702), which causes the baseband processor to perform the operations 700 of the Wake-Limiting Procedure. The baseband processor sets the wake flag to "false" (step 706) and performs the operations in the process flow 708 for pipe B (only pipe B still has pending data to transfer to the AP).

For pipe B, the baseband processor checks the value of the pipe B's wake-limiting counter (step 710). The value of pipe B's wake-limiting counter is three (because it was not reset), which is not less than pipe B's wake limit threshold of three. The baseband processor then determines that pipe B's fatal error flag is not set (step 712) and that it has performed the process flow 708 for all enabled pipes with pending downlink data packets (step 716). The baseband processor checks the wake flag (step 722) and because the wake flag is "false", the baseband processor is not permitted to wake the AP (step 726). At the end of the period of time T23, pipe A has no pending downlink data packets to transfer to the AP, and pipe B has one pending downlink data packet to transfer to the AP.

During time period T24, the AP switches from the sleep-low power state to the awake-high power state and sends a wake notification to the baseband processor. The AP then initiates a transfer of a pending downlink data packet on pipe B from the baseband processor to the AP, which causes the pending downlink data packet on pipe B to be transferred from the baseband processor to the AP. In response to a pending downlink data packet being transferred from the baseband processor to the AP over pipe B, the baseband processor resets the wake-limiting counter for pipe B to zero.

During a period of time T25, the baseband processor receives a sleep notification from the AP (step 702), which causes the baseband processor to perform the operations 700 of the Wake-Limiting Procedure. The baseband processor sets the wake flag to "false" (step 706). Because neither pipe A nor pipe B has a pending data transfer, the baseband processor proceeds with checking the wake flag (step 722) and because the wake flag is "false", the baseband processor is not permitted to wake the AP (step 726).

It will be readily appreciated by those of ordinary skill that different combinations and/or variations of the foregoing can be made, depending on the desired application and performance attributes.

Moreover, it will be recognized that while certain implementations and embodiments are described in terms of a specific sequence of steps of a method, these descriptions are only illustrative of the broader principles and architectures presented herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the principles and architectures presented herein. This description is in no way meant to be limiting, but rather should be taken as illustrative of the general principles of the disclosure. The scope should be determined with reference to the claims.

What is claimed is:

1. A portable electronic device, the device comprising:
a first processor apparatus and a second processor apparatus, wherein the first processor apparatus and the second processor apparatus are collectively configured to:
  determine whether a reduced-power state for the first processor apparatus should be implemented;
  verify that the second processor apparatus has not triggered a condition that prevents implementation of the reduced-power state for the first processor apparatus, the verification comprising access of data at a shared memory interface, the shared memory interface being accessible by both the first processor apparatus and the second processor apparatus; and
  cause the first processor apparatus to enter the reduced-power state.

2. The device of claim 1, wherein the verification that the second processor apparatus has not triggered the condition occurs subsequent to determination that the first processor apparatus should enter the reduced-power state.

3. The device of claim 2, wherein the determination of whether the reduced-power state for the first processor apparatus should be implemented comprises a determination of processing load for the first processor apparatus and when the processing load falls below a threshold parameter, the first processor apparatus flags an opportunity for reduced power consumption.

4. The device of claim 1, wherein subsequent to the verification that the second processor apparatus has not triggered the condition that prevents the implementation of the reduced-power state, the first processor apparatus is configured to notify the second processor apparatus via a write to the shared memory interface.

5. The device of claim 4, wherein the notification of the second processor apparatus further comprises an issuance of an interrupt that indicates the reduced-power state.

6. A method of implementing power management between a first independently operable processor and a second independently operable processor, the method comprising:
  determining, by the first independently operable processor, whether a reduced-power state for the first independently operable processor should be implemented;
  predicting a future activity of the second independently operable processor based at least on a historic processing burden of the second independently operable processor;
  based at least on the predicted future activity of the second independently operable processor, verifying, by the first independently operable processor, that the second independently operable processor has not triggered a condition that prevents implementation of the reduced-power state; and
  entering the reduced-power state by the first independently operable processor subsequent to the determining and the verifying.

7. The method of claim 6, wherein the verifying that the second independently operable processor has not triggered the condition occurs subsequent to determining that the first independently operable processor should enter the reduced-power state.

8. The method of claim 7, wherein the determining whether the reduced-power state for the first independently operable processor should be implemented comprises determining one or more of (i) a processing load of the first independently operable processor and (ii) current data traffic associated with the second independently operable processor.

9. The method of claim 7, further comprising exiting the reduced-power state, subsequent to entering the reduced-power state, based on occurrence of a wake condition.

10. The method of claim 9, wherein the exiting of the reduced-power state based on the occurrence of the wake condition comprises determining presence of a pending data transfer between the first independently operable processor and the second independently operable processor.

11. The method of claim 7, further comprising notifying the second independently operable processor of the entering into the reduced-power state by the first independently operable processor.

12. A non-transitory computer-readable apparatus comprising a non-transitory storage medium, the non-transitory storage medium comprising a computer program having a plurality of instructions configured to, when executed by a first processor apparatus, cause the first processor apparatus to:
  detect an indication that reduced-power operation of the first processor apparatus is desirable based at least on anticipated data traffic associated with the second processor apparatus;
  determine that a second processor apparatus has not triggered a condition that prevents the reduced-power operation of the first processor apparatus; and
  enter the reduced-power operation based at least on the determination of the second processor apparatus not having triggered the condition.

13. The non-transitory computer-readable apparatus of claim 12, wherein plurality of instructions are further configured to, when executed by the first processor apparatus, cause the first processor apparatus to:
  detect one or more wake conditions; and
  responsive to the detection of the one or more wake conditions, exit the reduced-power mode.

14. The non-transitory computer-readable apparatus of claim 12, wherein the detection of the indication that reduced-power operation is desirable is further based on one or more internal considerations, the one or more internal considerations comprising one or more of (i) a current processing load falling below a threshold, or (ii) then-current data traffic associated with the second processor apparatus.

15. The non-transitory computer-readable apparatus of claim 12, wherein the determination that the second processor apparatus has not triggered the condition that prevents reduced-power operation comprises a determination of a then-present power state of the second processor apparatus.

16. The non-transitory computer-readable apparatus of claim 12, wherein the entrance to the reduced-power operation by the first processor apparatus is responsive to the detection of one or more internal considerations.

17. The non-transitory computer-readable apparatus of claim 12, wherein plurality of instructions are further configured to, when executed by the first processor apparatus, cause the first processor apparatus to:
- transmit a message to the second processor apparatus, the message comprising a target field descriptive of either the first processor apparatus or the second processor apparatus;
- responsive to the target field being descriptive of the first processor apparatus, enter the reduced-power operation; and
- responsive to the target field being descriptive of the second processor apparatus, cause the second processor apparatus to enter the reduced-power operation.

18. The non-transitory computer-readable apparatus of claim 12, wherein plurality of instructions are further configured to, when executed by the first processor apparatus, cause the first processor apparatus to notify the second processor apparatus of the reduced-power operation of the first processor apparatus, the notification comprising information representative of one or more of: (i) a minimum or maximum sleep time, (ii) an indication of the reduced-power state, the reduced-power state comprising one of multiple power states, (iii) a wake-up latency associated with a duration required for exiting the reduced-power operation, or (iv) a starting time stamp.

19. The non-transitory computer-readable apparatus of claim 12, wherein plurality of instructions are further configured to, when executed by the first processor apparatus, cause the first processor apparatus to, based at least on an urgency of data to be transmitted to the first processor apparatus, cause the second processor apparatus to buffer at least a portion of the data.

20. The non-transitory computer-readable apparatus of claim 12, wherein the determination that the second processor apparatus has not triggered the condition that prevents the reduced-power operation of the first processor apparatus comprises retrieval, from a memory-mapped memory space, data representative of one or more parameters associated with the second processor apparatus, the data representative of the one or more parameters being configured to enable determination of the anticipated data traffic associated with the second processor apparatus.

* * * * *